(No Model.)
A. JACQUOT.
HARNESS.
No. 543,737.
Patented July 30, 1895.
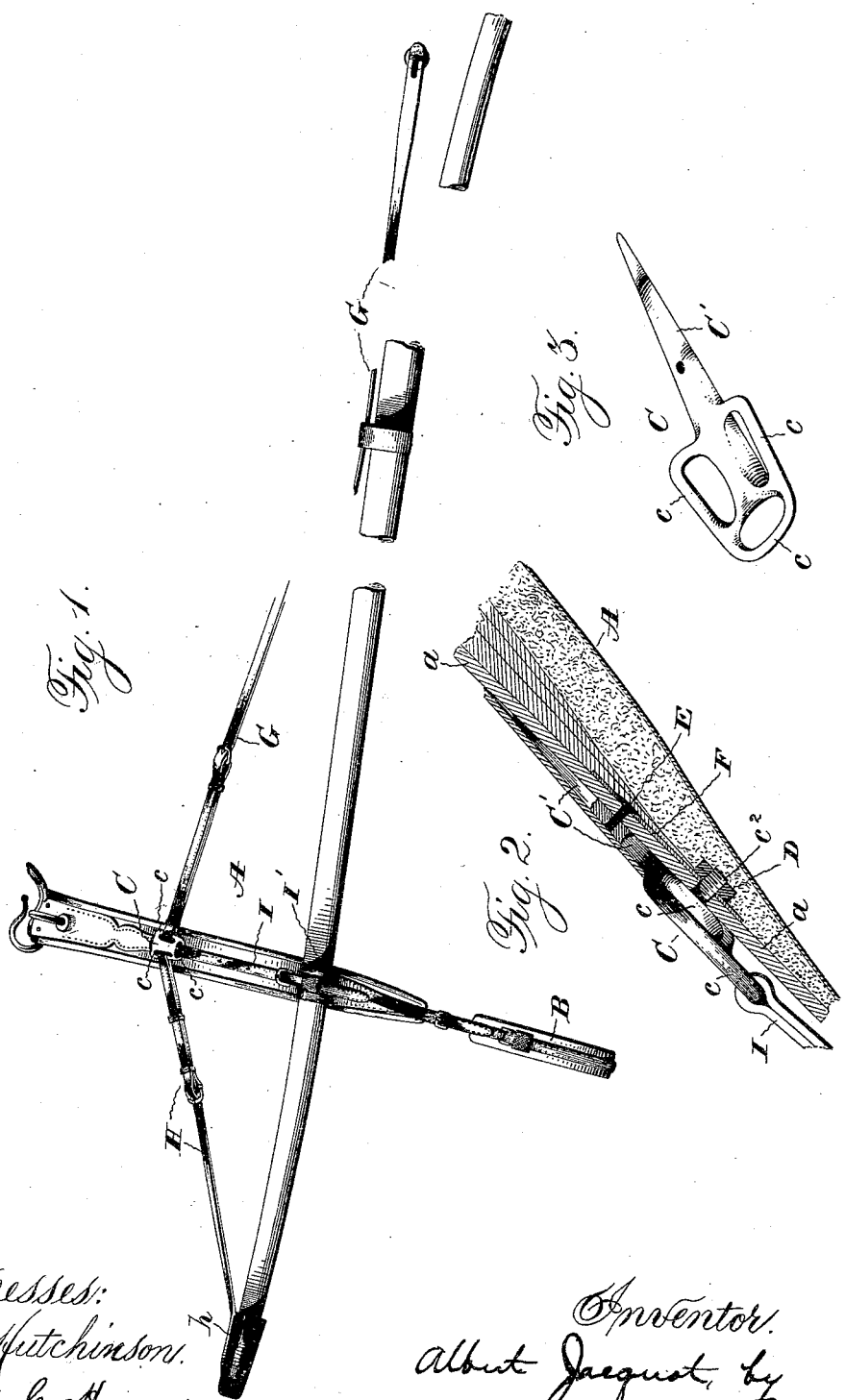
Witnesses:
Jas. E. Hutchinson.
Henry C. Hazard.
Inventor.
Albert Jacquot, by
Prindle and Russell, his Attys.

UNITED STATES PATENT OFFICE.

ALBERT JACQUOT, OF WILMINGTON, DELAWARE.

HARNESS.

SPECIFICATION forming part of Letters Patent No. 543,737, dated July 30, 1895.

Application filed December 20, 1894. Serial No. 532,462. (No model.)

*To all whom it may concern:*

Be it known that I, ALBERT JACQUOT, of Wilmington, in the county of New Castle, and in the State of Delaware, have invented certain new and useful Improvements in Harness; and I do hereby declare that the following is a full, clear, and exact description thereof, reference being had to the accompanying drawings, in which—

Figure 1 is a side elevation of my harness, showing it as connected with a vehicle; Fig. 2, a detail vertical section through the strap-attaching plate, and Fig. 3 a perspective view of said plate detached.

Letters of like name and kind refer to like parts in each of the figures.

The design of my invention is to provide a construction of harness in which the number of parts will be reduced to a minimum, so as to reduce the weight thereof, and the manner of the application of the same to the animal be such as in no degree to impede entire freedom of movement, and to this end said invention consists in the harness having the construction and combination of parts substantially as hereinafter specified.

In the carrying of my invention into practice I employ a harness-saddle A, of usual or any preferred construction, and a suitable belly-band B for securing the same to the animal and to said saddle. Upon each side I attach a plate C, that has three eyes or loops $c$, $c$, and $c$, one of the latter being at each side of the plate and the other at the bottom thereof. Said plate C is securely fastened in place by means of a threaded stud or pin $c^2$ on its under side, which passes through an opening in the saddle skirt or flap $a$ and receives a nut D, and by a rivet E, that connects said flap and a tongue or upward extension C' of said plate. Preferably a thin plate F is interposed between the inner face of the flap and the nut D and the inner head of the rivet E to serve both as a washer and as a reinforcing or strengthening means.

To the rear loop $c$ is attached a strap G that is adapted to be secured at its free end to the singletree of the vehicle, which strap serves the same purpose as an ordinary tug, and to the front loop $c$ is attached a strap H that extends forward and is adapted to be connected with the front end of the shaft, being furnished for this purpose with a socket $h$ that may be slipped over the shaft end. Said strap H constitutes the holdback. To the bottom loop $c$ is secured the upper end of the customary strap I for the support of the vehicle-shaft, said strap, as usual, having an eye or loop I' to receive the shaft. The lower loop $c$ is curved or rounded, as shown, to permit the strap I to have some motion forward and back without cramping or binding, and each of said loops $c$, $c$, and $c$ is placed sufficiently away from the surface of the saddle-flap to avoid any rubbing thereof by the straps.

Preferably each strap G and H is provided with a buckle to permit of adjustment in length, and, as usual, the loop or eye I' is adjustably connected to the strap I.

It will be noted that I employ neither collar, breast-strap, nor breeching, and the only appliance in contact with the animal is the saddle and belly-band, so that the animal's movements are absolutely untrammeled, and as all three of the straps by which connection with the vehicle is made are brought together and attached to the saddle at one point all strains center at such point, and hence I avoid the twisting action which would occur were said straps connected to the saddle at separate points—as, for instance, were the strap I attached to the saddle in the customary manner. This feature, of course, not only conduces to the comfort of the animal, but saves the harness from strain.

It will be obvious that a harness constructed in accordance with my invention weighs but little, and hence is especially adapted for speeding or track purposes, although I, of course, do not limit myself only to such use.

Having thus described my invention, what I claim is—

In a harness, the combination of a saddle, a plate having three loops or eyes, the threaded pin or stud, and the nut for connecting said plate to the saddle at one point, and the tongue or extension of such plate riveted to the saddle at another point, and straps connected with the loops, that respectively, form a tug, a holdback, and a thill support, substantially as and for the purpose set forth.

In testimony that I claim the foregoing I have hereunto set my hand this 13th day of December, 1894.

ALBERT JACQUOT.

Witnesses:
EVITT H. WELLS,
ROBERT BROWN.